United States Patent
Boas

(10) Patent No.: US 11,858,645 B2
(45) Date of Patent: Jan. 2, 2024

(54) ADJUSTABLE SUPPORT LINKS FOR AIRCRAFT

(71) Applicant: The Boeing Company, Chicago, IL (US)

(72) Inventor: Jonathan P. Boas, Glenolden, PA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/752,450

(22) Filed: May 24, 2022

(65) Prior Publication Data
US 2023/0382544 A1 Nov. 30, 2023

(51) Int. Cl.
*F02C 7/20* (2006.01)
*B64D 27/26* (2006.01)
*F16B 7/06* (2006.01)
*F16G 11/12* (2006.01)

(52) U.S. Cl.
CPC ............... *B64D 27/26* (2013.01); *F02C 7/20* (2013.01); *F16B 7/06* (2013.01); *F16G 11/12* (2013.01); *B64D 2027/262* (2013.01); *Y10T 403/295* (2015.01)

(58) Field of Classification Search
CPC .................................................. Y10T 403/295
See application file for complete search history.

(56) References Cited

U.S. PATENT DOCUMENTS

| | | | | | |
|---|---|---|---|---|---|
| 762,245 | A | * | 6/1904 | McGehee | F16G 11/12 403/43 |
| 925,448 | A | * | 6/1909 | Boyden | F16C 7/06 188/196 R |
| 2,059,175 | A | * | 10/1936 | Myracle | E21B 17/06 403/46 |
| 2,103,601 | A | * | 12/1937 | Stigall | E21B 17/06 403/46 |
| 3,291,090 | A | * | 12/1966 | Sevey | F16G 11/12 403/44 |
| 3,295,764 | A | * | 1/1967 | Geary | F02K 1/1207 239/265.41 |
| 5,906,450 | A | * | 5/1999 | Ng | F16G 11/12 403/22 |
| 6,902,342 | B1 | * | 6/2005 | Ditzler | F16C 7/06 403/78 |
| 8,770,602 | B1 | * | 7/2014 | Belleau | B62D 7/20 280/93.51 |

(Continued)

*Primary Examiner* — Todd E Manahan
*Assistant Examiner* — Marc J Amar
(74) *Attorney, Agent, or Firm* — Hanley, Flight & Zimmerman, LLC

(57) ABSTRACT

Adjustable support links for aircraft are disclosed herein. An adjustable support link includes a first rod end including a first shaft with first external threads, a second rod end including a second shaft with a bore having first internal threads, and a barrel nut at least partially disposed in the bore of the second rod end. The barrel nut has second external threads engaged with the first internal threads. The barrel nut having a channel. The first shaft is at least partially disposed in the channel. The channel has second internal threads engaged with the first external threads of the first rod end, such that rotation of the barrel nut in a first direction causes the first and second rod ends to move toward each other and rotation of the barrel nut in a second direction causes the first and second rod ends to move away from each other.

20 Claims, 7 Drawing Sheets

(56) References Cited

U.S. PATENT DOCUMENTS

| | | | | |
|---|---|---|---|---|
| 10,151,337 | B2* | 12/2018 | Hill | F16B 21/00 |
| 2012/0003032 | A1* | 1/2012 | Rump | B62D 17/00 |
| | | | | 403/44 |
| 2012/0012694 | A1* | 1/2012 | West | B64D 27/26 |
| | | | | 244/54 |
| 2015/0050122 | A1* | 2/2015 | Gutta | F16B 7/06 |
| | | | | 415/12 |
| 2021/0095707 | A1* | 4/2021 | Glaser | F16B 7/06 |
| 2021/0270312 | A1* | 9/2021 | Thompson | F16B 7/06 |
| 2022/0082121 | A1* | 3/2022 | Castaneda | F16B 7/06 |
| 2022/0106973 | A1* | 4/2022 | Baehr | F16B 39/08 |

* cited by examiner

ADJUSTABLE SUPPORT LINKS FOR AIRCRAFT

FIELD OF THE DISCLOSURE

This disclosure relates generally to aircraft and, more particularly, to adjustable support links for aircraft.

BACKGROUND

Support links, sometimes referred to as struts, are commonly used to connect two parts or components. Support links often include a first rod end that can be coupled to a first component and a second rod end that can be coupled to the second component. Support links are often used on aircraft to connect two components. Some support links are adjustable such that the distance between the first rod end and the second rod end can be lengthened or shortened.

SUMMARY

An example adjustable support link disclosed herein includes a first rod end including a first shaft with first external threads, a second rod end including a second shaft with a bore having first internal threads, and a barrel nut at least partially disposed in the bore of the second rod end. The barrel nut has second external threads engaged with the first internal threads of the second rod end. The barrel nut having a channel. The first shaft is at least partially disposed in the channel. The channel has second internal threads engaged with the first external threads of the first rod end, such that rotation of the barrel nut in a first direction causes the first and second rod ends to move toward each other and rotation of the barrel nut in a second direction causes the first and second rod ends to move away from each other.

An example aircraft disclosed herein includes an airframe, an engine, and an adjustable support link coupled between the airframe and the engine. The adjustable support link includes a first rod end coupled to the engine. The first rod end has a first shaft. The adjustable support link includes a second rod end coupled to the airframe. The first and second rod ends are aligned along a longitudinal axis. The second rod end has a second shaft with a bore. The first shaft of the first rod end extends into the bore of the second shaft such that at least a portion of the first shaft and the second shaft overlap in a radial direction. The adjustable support link also includes a barrel nut between the first shaft and the second shaft.

An example method disclosed herein includes coupling an engine to an airframe of an aircraft at a forward mount, coupling the engine to the airframe at a rear mount by coupling an adjustable support link between the engine and the airframe, and adjusting a length of the adjustable support link to move the engine relative to the airframe.

BRIEF DESCRIPTION OF THE DRAWINGS

In general, the same reference numbers will be used throughout the drawing(s) and accompanying written description to refer to the same or like parts. The figures are not to scale.

Figure 1:
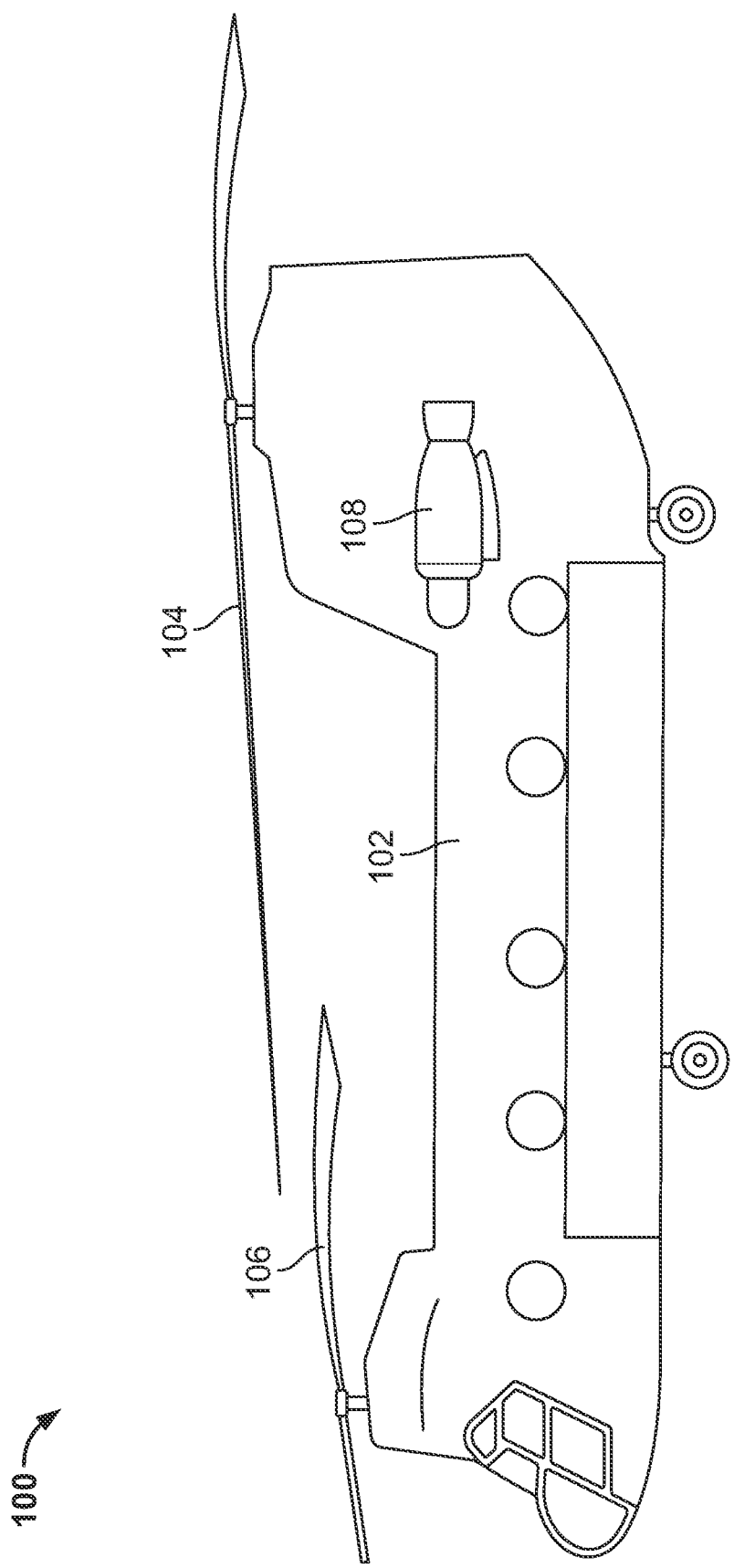
FIG. 1 illustrates an example aircraft in which the examples disclosed herein can be implemented.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example adjustable support links that can be used to couple two components. For example, the adjustable support links disclosed herein can be used for coupling an engine to an airframe of an aircraft, such as a helicopter. The adjustable support links disclosed herein are shorter than known adjustable support links, which enables the example support links to be used in smaller, more compact environments. The example adjustable support links are also configured such that the length of the adjustable support link can be increased or decreased while the adjustable support link is attached between the two components. As such, the example adjustable support links do not need to be disconnected from the components to adjust their length.

Known adjustable support links include a first rod end and a second rod end that are coupled by a central nut that has a threaded channel. The first rod end is threadably inserted into one end of the central nut and the second rod end is threadably inserted into the opposite end of the central nut. The first and second rod ends can be screwed into and out of the central nut to lengthen or shorten the overall length of the adjustable support link. These known adjustable support links are effective for longer gaps or spaces, but can only be shortened a certain amount. In particular, there needs to be a certain amount of thread engagement between the rod ends and the central nut. Therefore, the rod ends and the central nut can only be reduced to a certain size. As such, known adjustable support links have longer minimum lengths that prevent their use in smaller applications. Also, because of the threading configuration, some known adjustable support links have to be disconnected from the two components so that the rod ends can be screwed into and out of the central nut to lengthen or short the adjustable support link. This additional step is time consuming. Also, in some known adjustable support links, the rod ends have to be rotated at 180° increments to ensure the rod ends remain aligned in the same direction. Further, because the rod ends are independently rotatable relative to the central nut, the rod ends often become misaligned relative to each other.

Disclosed herein are example adjustable support links that address at least the above-noted drawbacks. An example adjustable support link disclosed herein includes a first rod end, a second rod end, and a barrel nut. The first rod end includes a first shaft with first external threads. The second rod end includes a second shaft with a bore having first internal threads. The barrel nut is partially disposed in the bore of the second shaft. The barrel nut has second external threads that are engaged with the first internal threads of the second shaft. The barrel nut has a channel with second internal threads. The first shaft is partially disposed in the channel (and, thus, in the bore of the second shaft) such that the first external threads of the first shaft are engaged with the second internal threads of the barrel nut. The threads between the first rod end and the barrel nut are oppositely or reversely threaded relative to the threads between the second rod end and the barrel nut. Therefore, when the barrel nut is rotated in a first direction, the first and second rod ends are moved (e.g., unscrewed) outward from the barrel nut and away from each other, and when the barrel nut is rotated in a second direction (opposite the first direction) the first and second rod ends are moved (e.g., screwed into) toward the barrel nut and toward each other. Thus, the length of the adjustable support link can be increased or decreased, which is beneficial when rigging the adjustable support link between two components. The configuration of the first shaft extending into the barrel nut, which is disposed in the second shaft, enables the first shaft and the second shaft to at least partially overlap in a radial direction. This enables the barrel nut to maintain a sufficient amount of threaded engagement with the first and second rod ends while reducing (e.g., minimizing) the distance between the first and second rod ends. As such, the adjustable support link can achieve shorter lengths than known adjustable support links.

Also, while the first and second rod ends are coupled to respective components, such as an engine and an airframe, the barrel nut can be rotated to lengthen or shorten the adjustable support think, thereby moving or adjusting the position of the engine relative to the airframe. As such, the adjustable support link can be adjusted while fully loaded. Further, the adjustable support link does not need to be disconnected from the engine and the airframe to lengthen or shorten the adjustable support link. This saves considerable time when rigging and installing the engine on the airframe. Further, the rod ends remain aligned while the adjustable support link is lengthened or shorted. Also, the barrel nut can be rotated any amount to lengthen or shorten the adjustable support link, thereby achieving infinite adjustability.

Turning now to the figures, FIG. 1 illustrates an example aircraft 100 in which the examples disclosed herein can be implemented. In this example, the aircraft 100 is a rotorcraft or rotary-wing aircraft, commonly referred to as a helicopter. The aircraft 100 includes a fuselage 102 that can hold one or more persons and/or cargo. In the illustrated example, the aircraft 100 includes first and second rotors 104, 106 that are driven to produce lift to fly the aircraft 100. The rotors 104, 106 are powered by one or more engines. For example, in FIG. 1, the aircraft 100 includes an engine 108 mounted on a side of the fuselage 102. In some examples, a second engine is mounted on the opposite side of the fuselage 102. The engine 108 produces power to drive the rotors 104, 106 as well as other systems on the aircraft 100. In some examples, the engine 108 can also produce thrust to propel the aircraft 100 in a forward direction. Disclosed herein are example adjustable supports links that can be used to couple the engine 108 to the fuselage 102.

Figure 2:
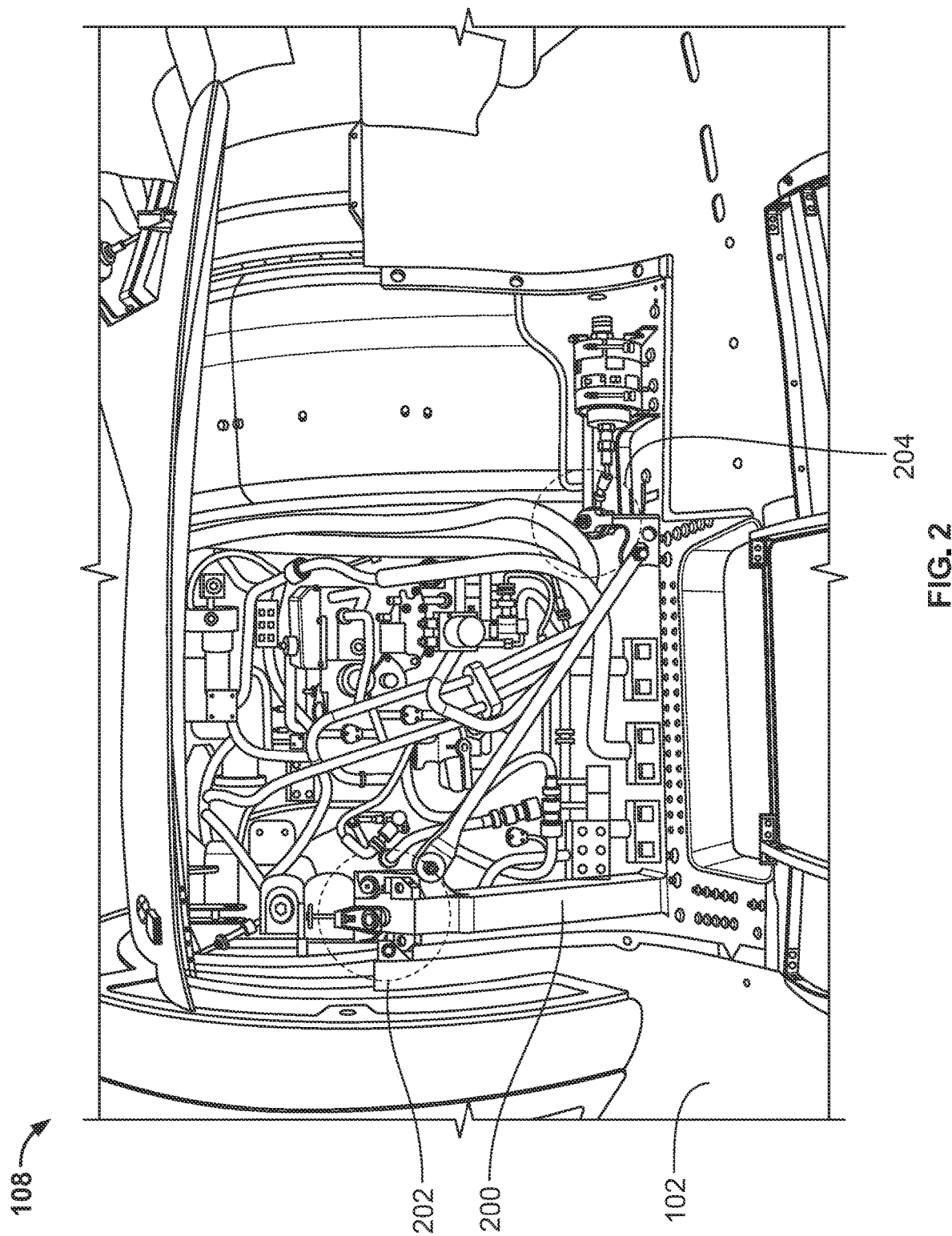
FIG. 2 illustrates an example engine coupled to an example airframe of the example aircraft of FIG. 1.

FIG. 2 is an enlarged view of the example engine 108 coupled to the fuselage 102. The fuselage 102 of the aircraft 100 has an airframe 200, which includes one or more support structures such a I-beams, ribs, webs, etc. that form the internal structure of the aircraft 100. The engine 108 is coupled or mounted to the airframe 200 at multiple locations. In this example, the engine 108 is coupled to the airframe 200 at two forward connection points and one rearward connection point. For example, the engine 108 is coupled to the airframe 200 at a first forward mount 202. One or more bolts may be fastened between the airframe and the engine 108 at the first forward mount 202. In some examples, the engine 108 is coupled to the airframe 200 at a second forward mount on the opposite side. In the illustrated example, the engine 108 is also coupled to the airframe 200 at a rear mount 204, which can be formed by an example adjustable support link disclosed herein. In some examples, the rear portion of the engine 108 is coupled to the airframe 200 at multiple rear mounts. However, in other examples, the rear portion of the engine 108 is only coupled to the airframe 200 at one rear mount (e.g., the rear mount 204).

Figure 3:
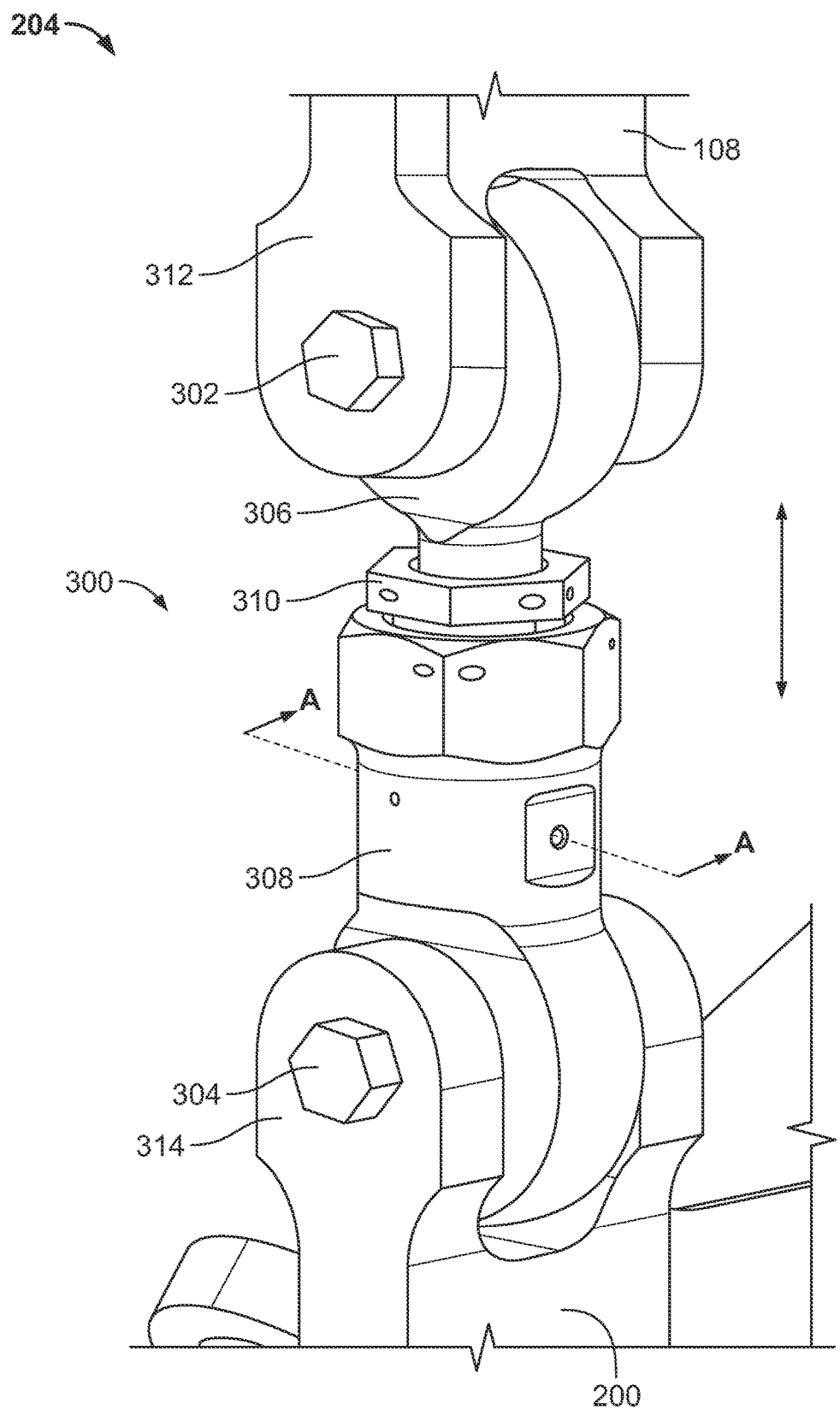
FIG. 3 illustrates an example adjustable support link used to couple the example engine and the example airframe of FIG. 2.

FIG. 3 illustrates an example adjustable support link 300 constructed in accordance with the teachings of this disclosure. The adjustable support link 300 is used to couple the engine 108 and the airframe 200 at the rear mount 204. The adjustable support link 300 may also be referred to as a strut or strut link. In this example, the adjustable support link 300 is coupled to the engine 108 and the airframe 200 by bolts. For example, one end of the adjustable support link 300 is coupled to the engine 108 by a first bolt 302 and the opposite end of the adjustable support link 300 is coupled to the airframe 200 by a second bolt 304. In other examples, the ends of the adjustable support link 300 can be coupled to the engine 108 and the airframe 200 via other fastening techniques (e.g., welding, latches, etc.). The length of adjustable support link 300 can be adjusted. For example, the adjustable support link 300 can be lengthened or shortened. This helps account for tolerances in the size and shape of the engine 108 and also helps when installing and adjusting the position of the engine 108 relative to the airframe 200.

In the illustrated example, the adjustable support link 300 includes a first rod end 306, a second rod end 308, and a barrel nut 310. The engine 108 has a first attachment portion 312 (e.g., on a casing of the engine 108) and the airframe 200 has a second attachment portion 314. In this example, the first and second attachment portions 312, 314 are implemented as yokes. The first rod end 306 is coupled to the first attachment portion 312 of the engine 108 via the first bolt 302. The second rod end 308 is coupled to the second attachment portion 314 of the airframe 200 via the second bolt 304. The barrel nut 310 is disposed between the first and second rod ends 306, 308. The barrel nut 310 can be rotated to move the first and second rod ends 306, 308 toward or away from each other. For example, when the barrel nut 310 is rotated in a first direction (e.g., clockwise), the first and second rod ends 306, 308 are moved away from each other, thereby lengthening the adjustable support link 300. When the barrel nut 310 is rotated in a second direction (e.g., counter-clockwise), the first and second rod ends 306, 308 are moved toward each other, thereby shortening the adjustable support link 300.

In some examples, when installing the engine 108, the engine 108 is first connected to the airframe 200 at the first forward mount 202 (FIG. 2) and the second forward mount. In some examples, the engine 108 is pivotable about the first and second forward mounts. Then, the rear portion of the engine 108 is lowered down close to the rear mount 204. The adjustable support link 300 can be lengthened or shortened to span the gap between the first and second attachment portions 312, 314, and then coupled to the first and second attachment portions 312, 314. Further, once the adjustable support link 300 is coupled between the engine 108 and the airframe 200, the length of the adjustable support link 300 can be adjusted to move the engine 108 (e.g., up or down) relative to the airframe 200. This can help align or position the engine 108 to a desired location.

Figure 4:
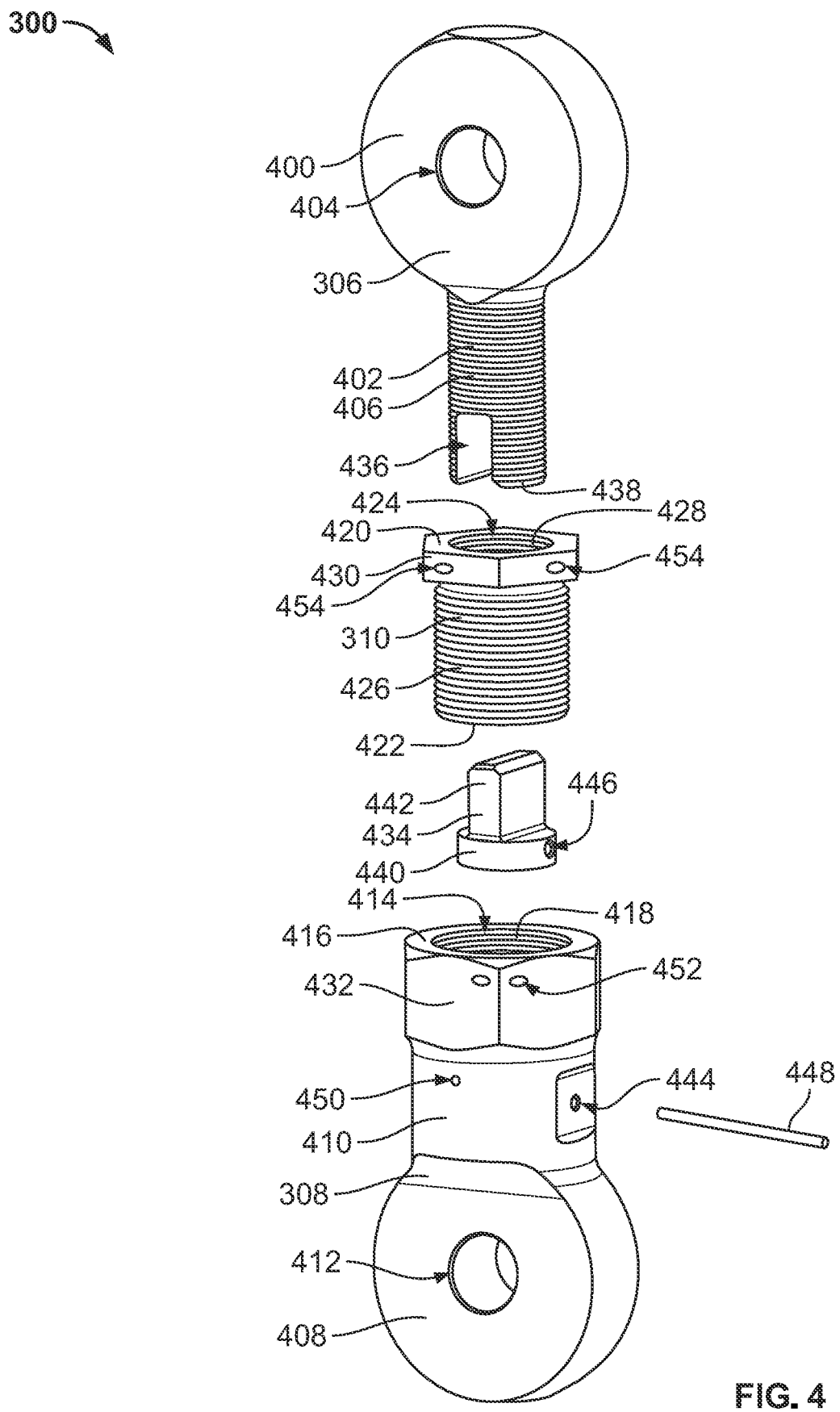
FIG. 4 is an exploded view of the example adjustable support link of FIG. 3.

FIG. 4 is an exploded view of the example adjustable support link 300. The first rod end 306 includes a first end portion 400 and a first shaft 402 coupled to and extending from the first end portion 400. In some examples, the first rod end 306 is constructed as a single unitary part or component (e.g., a monolithic structure). In other examples, the first end portion 400 and the first shaft 402 can be constructed as separate parts or components that are coupled together (e.g., via welding). In the illustrated example, the first end portion 400 is disc-shaped. The first end portion 400 has a first opening 404 (e.g., a through-hole) to receive the first bolt 302. In some examples, a spherical bearing is disposed in the first opening 404, which enables the adjustable support link 300 to pivot or rotate along multiple axes relative to the engine 108 (FIGS. 1 and 2). In the illustrated example, the first shaft 402 has first external threads 406.

In the illustrated example, the second rod end 308 includes a second end portion 408 and a second shaft 410 coupled to and extending from the second end portion 408. In some examples, the second rod end 308 is constructed as a single unitary part or component (e.g., a monolithic structure). In other examples, the second end portion 408 and the second shaft 410 can be constructed as separate parts or components that are coupled together (e.g., via welding). In the illustrated example, the second end portion 408 is disc-shaped, similar to the first end portion 400. The second end portion 408 has a second opening 412 (e.g., a through-hole) to receive the second bolt 304 (FIG. 3). In some examples, a spherical bearing is disposed in the second opening 412. In the illustrated example, the second shaft 410 has a bore 414 extending into an end 416 of the second shaft 410. The bore 414 has first internal threads 418.

In the illustrated example, the barrel nut 310 has a first end 420, a second end 422 opposite the first end 420, and a channel 424 extending between the first and second ends 420, 422. When the adjustable support link 300 is assembled, the barrel nut 310 is at least partially disposed in the bore 414 of the second rod end 308. The barrel nut 310 has second external threads 426 that engage (threadably engage) the first internal threads 418 of the second rod end 308. The channel 424 of the barrel nut 310 has second internal threads 428. When the adjustable support link 300 is assembled, the first shaft 402 is partially disposed in (e.g., extends into) the channel 424 of the barrel nut 310, such that the first external threads 406 of the first shaft 402 are engaged (threadably engaged) with the second internal threads 428 of the barrel nut 310. The first external threads 406 and the second internal threads 428 are oppositely or reversely threaded relative to the first internal threads 418 and the second external threads 426. For example, the first external threads 406 and the second internal threads 428 may be standard right-hand threads, while the first internal threads 418 and the second external threads 426 may be reverse left-hand threads. Therefore, rotation of the barrel nut 310 causes the first and second rod ends 306, 308 to be screwed toward or away from the barrel nut 310.

In the illustrated example, the barrel nut 310 has a head 430 at or near the first end 420. A person or machine can engage the head 430 with their hand and/or a tool (e.g., a wrench) to rotate the barrel nut 310. In this example, the head 430 has a hexagonal shape or cross-section (sometimes referred to as a hex head). However, in other examples the head 430 can have different shapes (e.g., corresponding to a certain type of tool). In the illustrated example, a portion 432 of an external surface of the second shaft 410 is faceted, which enables the second shaft 410 to be engaged by a person and/or tool. Therefore, the person or machine can grasp the second shaft 410 with another tool while rotating the barrel nut 310, or vice versa. In this example, the portion 432 has a hexagonal shape or cross-section. In other examples, the portion 432 can have a different shape.

In the illustrated example, the adjustable support link 300 includes a plug 434. When the adjustable support link 300 is assembled, the plug 434 is disposed in the bore 414 and coupled to the second shaft 410. Further, when the adjustable support link 300 is assembled, the plug 434 extends into a notch 436 in an end 438 of the first shaft 402 to prevent relative rotation of the first and second rod ends 306, 308. For example, in the illustrated example, the plug 434 has a disc-shaped portion 440 and a post 442 extending from the disc-shaped portion 440. In the illustrated example, the second shaft 410 has a first opening 444 (e.g., a through-hole), and the plug 434 has a second opening 446 (e.g., a through-hole) formed in the disc-shaped portion 440. When the adjustable support link 300 is assembled, the plug 434 is disposed in the bore 414 and the second opening 446 is aligned with the first opening 444. The adjustable support link 300 includes a pin 448 (e.g., a roll pin, a tapered pin, a cotter pin) that can be inserted into the first and second opening 444, 446, which couples the plug 434 to the second rod end 308. The post 442 of the plug 434 has a same shape as the notch 436. When the adjustable support link 300 is assembled, the post 442 extends into the notch 436 of the first shaft 402, which prevents relative rotation of the first and second rod ends 306, 308.

In some examples, the first rod end 306, the second rod end 308, the barrel nut 310, the plug 434, and the pin 448 are constructed of metal, such as stainless steel. In other examples, any of the first rod end 306, the second rod end 308, the barrel nut 310, the plug 434, and/or the pin 448 can be constructed of other materials (e.g., aluminum, titanium, etc.).

Figure 5:
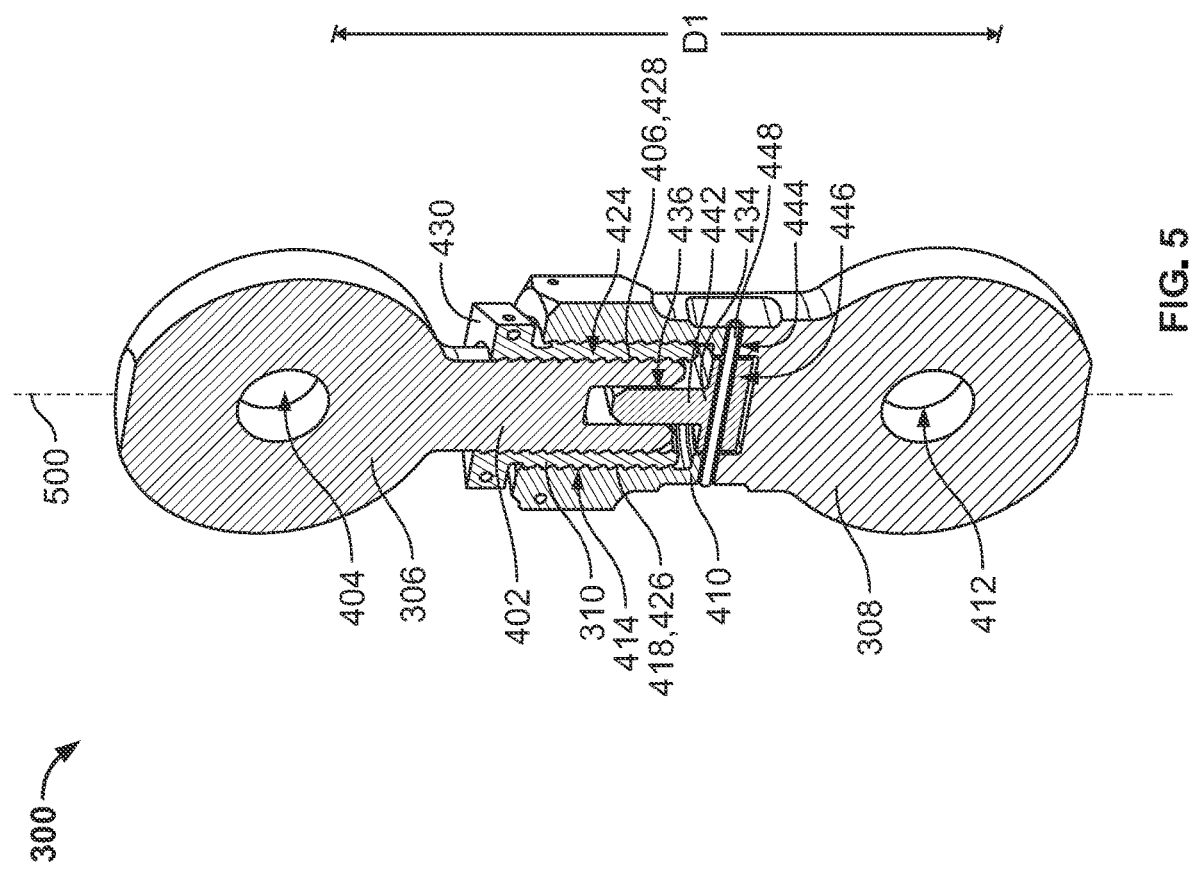
FIG. 5 is cross-sectional view of the example adjustable support link taken along line A-A of FIG. 3.

FIG. 5 is a cross-sectional view of the adjustable support link 300 taken along line A-A of FIG. 3. As shown in FIG. 5, the first and second rod ends 306, 308 are aligned long a longitudinal axis 500 of the adjustable support link 300. In the illustrated example, a portion of the barrel nut 310 is disposed in the bore 414 of the second rod end 308. The barrel nut 310 is between the first shaft 402 and the second shaft 410. The second external threads 426 of the barrel nut 310 are engaged with the first internal threads 418 of the second shaft 410 of the second rod end 308. Further, as shown in FIG. 5, the first shaft 402 of the first rod end 306 is partially disposed in the channel 424 of the barrel nut 310 (and, thus, extends into the bore 414 of the second shaft 410). The second internal threads 428 of the barrel nut 310 are engaged with the first external threads 406 of the first shaft 402 of the first rod end 306. As such, at least a portion of the first and second shafts 402, 410 overlap in a radial direction extending from the longitudinal axis 500. This arrangement enables the barrel nut 310 to maintain a certain amount of thread contact with the first and second rod ends 306, 308 while minimizing the overall length of the adjustable support link 300 compared to known adjustable support links. As such, the example adjustable support link 300 can be used in smaller spaces than known adjustable support links. The barrel nut 310 can be rotated to adjust a distance D1 between the first and second openings 404, 412 of the first and second rod ends 306, 308. The position shown in FIG. 5 may be considered a fully contracted position, which represents the shortest distance achievable with the adjustable support link 300. In some examples, in the fully contracted position shown in FIG. 5, the distance D1 between the first and second openings 404, 412 of the first and second rod ends 306, 308 is less than about 3.5 inches (e.g., ±0.1 inches). In other examples, the distance D1 may be greater than 3.5 inches in the contracted position.

In the illustrated example of FIG. 5, the plug 434 is disposed in the bore 414 of the second shaft 410. The pin 448 is inserted through the first and second openings 444, 446, which couples the plug 434 to the second shaft 410, and prevents relative rotation between the plug 434 and the second shaft 410. The post 442 extends into the notch 436 in the first shaft 402. This prevents relative rotation between the first and second rod ends 306, 308.

Figure 6:
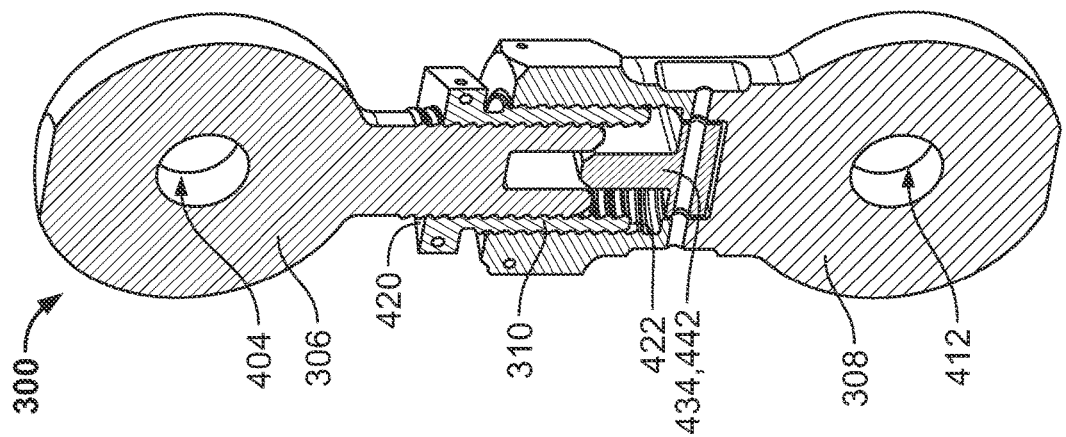
FIG. 6 shows the example adjustable support link of FIG. 5 after an example barrel nut has been rotated to lengthen the example adjustable support link.

As shown in FIG. 5, the head 430 of the barrel nut 310 is disposed outside of the bore 414 of the second shaft 410. As such, a person or machine can rotate the head 430 of the barrel nut 310 with a tool (e.g., a wrench). When the barrel nut 310 is rotated in a first direction relative to the first and second rod ends 306, 308, the first and second rod ends 306, 308 are moved linearly away from each other. For example, FIG. 6 shows the adjustable support link 300 after the barrel nut 310 has been rotated in the first direction. As shown in FIG. 6, the first rod end 306 has been moved outward (upward in FIG. 6) from the first end 420 of the barrel nut 310, and the second rod end 308 has been moved outward (downward in FIG. 6) relative to the second end 422 of the barrel nut 310. To shorten the adjustable support link 300, the barrel nut 310 can be rotated in a second direction opposite the first direction. Therefore, the adjustable support link 300 has a telescoping configuration. The notch 436 of the first shaft 402 slides along the post 442 of the plug 434 as the first and second rod ends 306, 308 are moved toward or away from each other. The plug 434 ensures the first and second rod ends 306, 308 do not rotate relative to each other. In this example, the first and second rod ends 306, 308 are parallel. As such, the first opening 404 of the first rod end 306 and the second opening 412 of the second rod end 308 remain aligned in the same relative direction or orientation. However, in other examples, the first and second rod ends 306, 308 can be clocked or angled relative to each other (e.g., 90°). Rotating the barrel nut 310 does not change the relationship between the first and second rod ends 306, 308. Therefore, the adjustable support link 300 can be lengthened or shortened without changing the relative alignment or orientation of the first and second rod ends 306, 308.

In some examples, the first external threads 406 and the second internal threads 428 have a first thread pitch, and the first internal threads 418 and the second external threads 426 have a second thread pitch that is different than the first thread pitch. For example, the first thread pitch may be 18 threads/inch, and the second thread pitch may be 14 threads/inch. Therefore, when rotating the barrel nut 310, the second rod end 308 is moved outward from the barrel nut 310 further than the first rod end 306 is moved outward from the barrel nut 310. However, in other examples, the first and second thread pitches may be the same.

Referring back to FIG. 4, the second shaft 410 has an opening 450, which may also be referred to as a witness hole. The opening 450 extends through the wall of the second shaft 410 and into the bore 414 in a direction that is perpendicular to the longitudinal axis 500 (FIG. 5). Therefore, at least a portion of the barrel nut 31 that is disposed in the bore 414 is viewable through the opening 450. In other words, the opening 450 enables a person to see into the bore 414 and, specifically, see the barrel nut 310 in the bore 414. However, if the barrel nut 310 is unscrewed a certain amount, the barrel nut 310 may not be viewable through the opening 450. This serves as an indicator to stop rotating the barrel nut 310, which helps ensure a certain amount of threaded contact remains between the barrel nut 310 and the first and second rod ends 306, 308.

Figure 7:
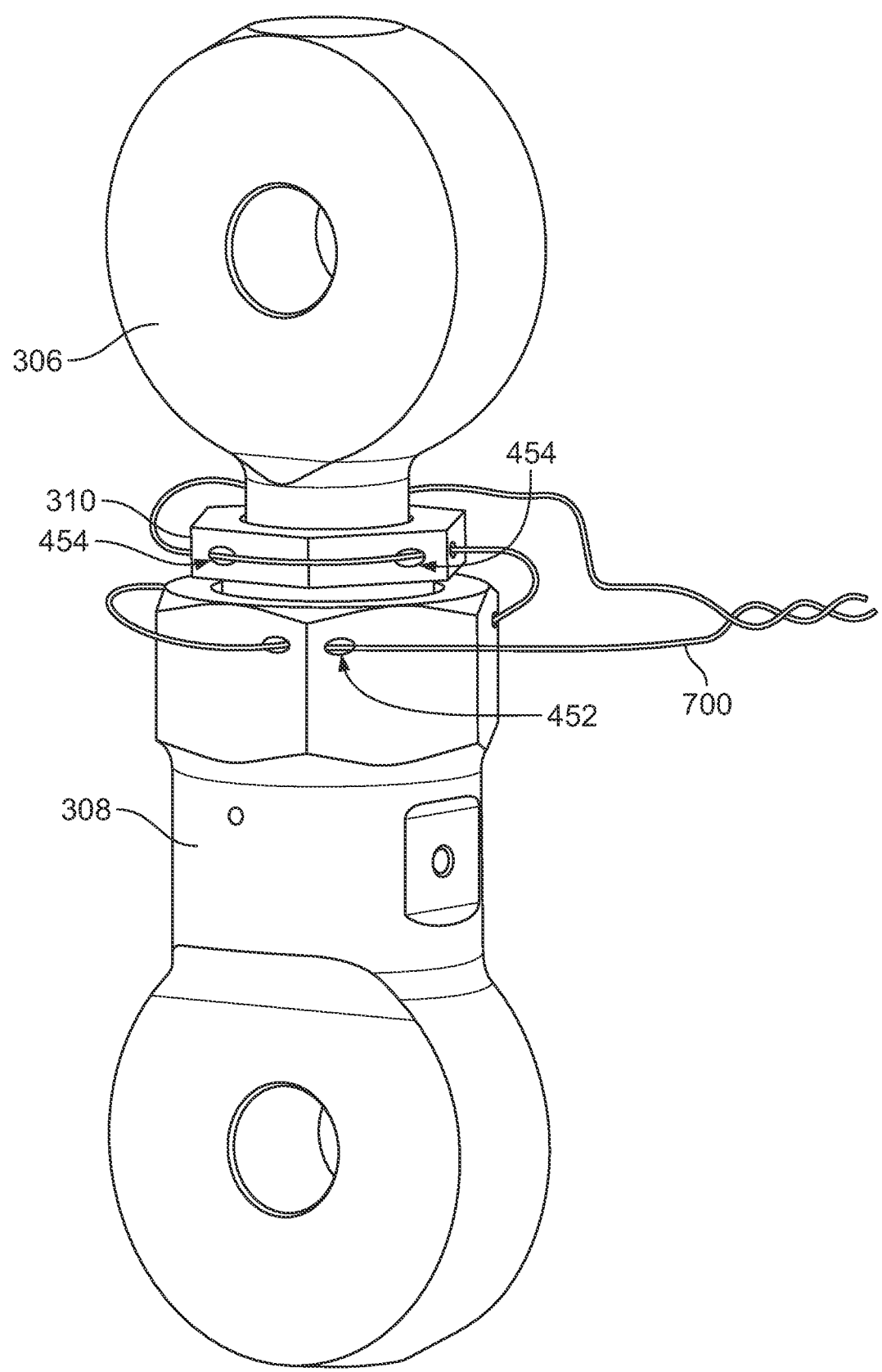
FIG. 7 illustrates the example adjustable support link of FIG. 3 with example wire used to lock the example barrel nut.

As shown in FIG. 4, the second rod end 308 and the barrel nut 310 include a set of wire openings 452, 454 (e.g., channels, through-holes). In some examples, a wire can be routed through the wire openings 452, which prevents the barrel nut 310 from being rotated relative to the first and second rod ends 306, 308. For example, FIG. 7 shows an example wire 700 that has been routed through the wire openings 452. The ends of the wire 700 can be twisted together and/or locked. The wire 700 prevents the barrel nut 310 from rotating relative to the first and second rod ends 306, 308 and, thus, locks the barrel nut 310 in place. In some examples, the first rod end 306 can include one or more wire openings in addition to or as an alternative to the second rod end 308.

Figure 8:
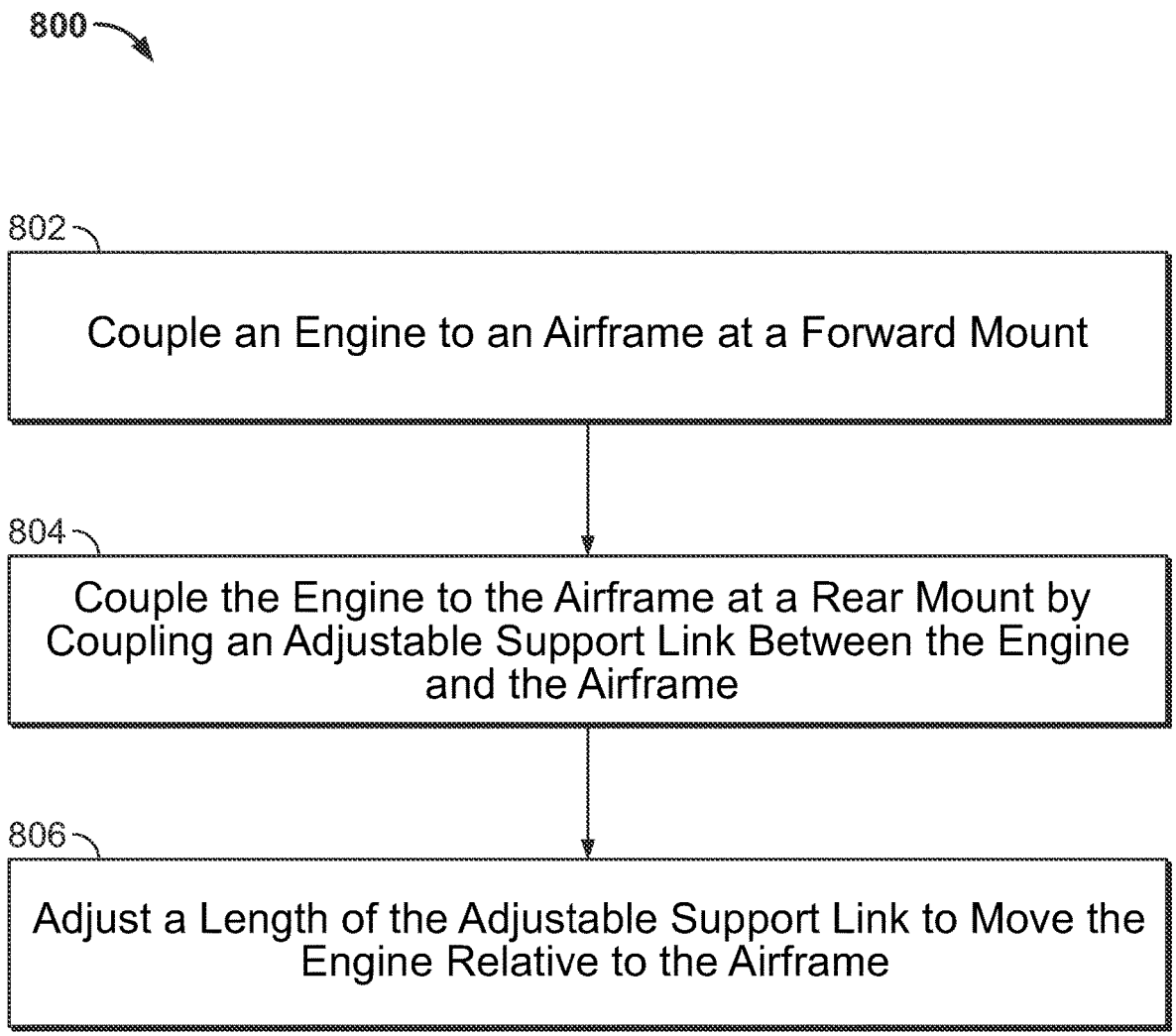
FIG. 8 is a flowchart representative of an example method of coupling an example engine to an example airframe of an example aircraft using the example adjustable support link of FIG. 3.

FIG. 8 is an example method 800 of mounting the engine 108 to the airframe 200 using the example adjustable support link 300. At block 802, the method 800 includes coupling the engine 108 to the airframe 200 at a forward mount, such as at the first forward mount 202. In some examples, the engine 108 is also coupled to the airframe 200 at a second forward mount. In some examples, the first and second forward mounts are hinged connections. As such, the rear end of the engine 108 can be rotated or pivoted downward toward the rear mount 204.

At block 804, the method 800 includes the coupling the engine 108 to the airframe 200 at the rear mount 204 by coupling the adjustable support link 300 between the engine 108 and the airframe 200. For example, the first rod end 306 can be coupled to the first attachment portion 312 of the engine 108 via the first bolt 302, and the second rod end 308 can be coupled to the second attachment portion 314 of the airframe 200 via the second bolt 304. In some examples, the barrel nut 310 can be rotated to lengthen or shorten the adjustable support link 300 to enable the first and second rod ends 306, 308 to align with the respective attachment portions 312, 314.

At block 806, the method 800 includes adjusting a length of the adjustable support link 300 to move the engine 108 relative to the airframe 200. For example, it may be desired to move the rear portion of the engine 108 upward or downward. In such an instance, a person or machine can rotate the barrel nut 310, which drives the rod ends 306, 308 toward or away from each other (depending on the direction of rotation). Therefore, the position of the engine 108 can be adjusted while the engine 108 is coupled to the airframe 200. As such, the adjustable support link 300 does not need to be disconnected from the engine 108 and the airframe 200 to adjust the length.

While the example adjustable support link 300 is disclosed in connection with coupling the engine 108 to the airframe 200, the example adjustable support link 300 can be used on any other location on the aircraft 100. Further, the example adjustable support link 300 can be used in another environment or application as a link between two attachment points. Therefore, the example adjustable support link 300 is not limited to just use with aircraft.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example adjustable support links have been disclosed that can achieve shorter, smaller distances than known adjustable support links. Further, the example adjustable support links can be adjusted while connected between two components, which saves significant time during installation and rigging. The example adjustable support links have a low length-diameter ratio facilitated by the use of internal and external threaded parts arranged in parallel to permit length adjustment after install and under load while prohibiting rotation movement of ends via a locking mechanism.

Example apparatus, systems, methods, and articles of manufacture have been disclosed herein. Examples and example combinations include the following:

Example 1 is an adjustable support link comprising a first rod end including a first shaft with first external threads, a second rod end including a second shaft with a bore having first internal threads, and a barrel nut at least partially disposed in the bore of the second rod end. The barrel nut has second external threads engaged with the first internal threads of the second rod end. The barrel nut has a channel. The first shaft is at least partially disposed in the channel. The channel has second internal threads engaged with the first external threads of the first rod end, such that rotation of the barrel nut in a first direction causes the first and second rod ends to move toward each other and rotation of the barrel nut in a second direction causes the first and second rod ends to move away from each other.

Example 2 includes the adjustable support link of Example 1, wherein the first and second rod ends are aligned along a longitudinal axis, and wherein at least a portion of the first and second shafts overlap in a radial direction extending from the longitudinal axis.

Example 3 includes the adjustable support link of Examples 1 or 2, further including a plug disposed in the bore of the second shaft and coupled to the second shaft. The plug extends into a notch in an end of the first shaft to prevent relative rotation of the first and second rod ends.

Example 4 includes the adjustable support link of Example 3, wherein the second shaft has a first opening and the plug has a second opening aligned with the first opening. The adjustable support link further includes a pin extending through the first and second openings to prevent relative rotation of the plug and the second shaft.

Example 5 includes the adjustable support link of Example 4, wherein the plug includes a disc-shaped portion and a post. The second opening is formed in the disc-shaped portion. The post extends from the disc-shaped portion and into the notch in the end of the first shaft.

Example 6 includes the adjustable support link of any of Examples 1-5, wherein the barrel nut has a head disposed outside of the bore.

Example 7 includes the adjustable support link of Example 6, wherein a portion of an external surface of the second shaft is faceted.

Example 8 includes the adjustable support link of any of Examples 1-7, wherein the second shaft has an opening extending in a direction that is perpendicular to a longitudinal axis of the adjustable support link, such that at least a portion of the barrel nut that is disposed in the bore is viewable through the opening.

Example 9 includes the adjustable support link of any of Examples 1-8, wherein the first external threads and the second internal threads have a first thread pitch, and the first internal threads and the second external threads have a second thread pitch different than the first thread pitch.

Example 10 includes the adjustable support link of any of Examples 1-9, wherein the second rod end and the barrel nut include wire openings to receive a wire to prevent rotation of the barrel nut relative to the first and second rod ends.

Example 11 includes the adjustable support link of any of Examples 1-10, wherein the first rod end has a first end portion with a first opening to receive a first bolt, and the second rod end has a second end portion with a second opening to receive a second bolt.

Example 12 includes the adjustable support link of Example 11, wherein a distance between the first opening and the second opening is less than about 3.5 inches.

Example 13 is an aircraft comprising an airframe, an engine, and an adjustable support link coupled between the airframe and the engine. The adjustable support link includes a first rod end coupled to the engine. The first rod end has a first shaft. The adjustable support link also includes a second rod end coupled to the airframe. The first and second rod ends are aligned along a longitudinal axis. The second rod end has a second shaft with a bore. The first shaft of the first rod end extends into the bore of the second shaft such that at least a portion of the first shaft and the second shaft overlap in a radial direction. The adjustable support link also includes a barrel nut between the first shaft and the second shaft.

Example 14 includes the aircraft of Example 13, wherein: the first shaft has first external threads, the second shaft has first internal threads, the barrel nut has second external threads engaged with the first internal threads of the second rod end, and the barrel nut has a channel. The first shaft is at least partially disposed in the channel, the channel having second internal threads engaged with the first external threads of the first rod end.

Example 15 includes the aircraft of Example 14, wherein the barrel nut has a head disposed outside of the bore of the second shaft.

Example 16 includes the aircraft of Examples 14 or 15, further including a plug disposed in the bore of the second shaft and coupled to the second shaft, the plug extending into a notch in an end of the first shaft to prevent relative rotation of the first and second rod ends.

Example 17 includes the aircraft of Example 16, wherein the second shaft has a first opening and the plug has a second opening aligned with the first opening. The adjustable support link further includes a pin extending through the first and second openings to prevent relative rotation of the plug and the second shaft.

Example 18 includes a method comprising coupling an engine to an airframe of an aircraft at a forward mount, coupling the engine to the airframe at a rear mount by coupling an adjustable support link between the engine and the airframe, and adjusting a length of the adjustable support link to move the engine relative to the airframe.

Example 19 includes the method of Example 18, wherein coupling the adjustable support link between the engine and the airframe includes coupling a first rod end of the adjustable support link to a first attachment portion of the engine and coupling a second rod end of the adjustable support link to a second attachment portion of the airframe. The first rod end has a first shaft and the second rod end having a second shaft with a bore. At least a portion of the first shaft extends into the bore such that a portion of the first shaft and the second shaft overlap in a radial direction.

Example 20 includes the method of Example 19, wherein the adjustable support link includes a barrel nut partially disposed in the bore of the second rod end, the barrel nut threadably engaged with the first shaft and threadably engaged with the second shaft, and wherein adjusting the length of the adjustable support link includes rotating the barrel nut relative to the first and second rod ends.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An adjustable support link comprising:
   a first rod end including a first shaft with first external threads;
   a second rod end including a second shaft with a bore having first internal threads, the second shaft having a first opening;
   a barrel nut at least partially disposed in the bore of the second rod end, the barrel nut having second external threads engaged with the first internal threads of the second rod end, the barrel nut having a channel, the first shaft at least partially disposed in the channel, the channel having second internal threads engaged with the first external threads of the first rod end, such that rotation of the barrel nut in a first direction causes the first and second rod ends to move toward each other and rotation of the barrel nut in a second direction causes the first and second rod ends to move away from each other;
   a plug disposed in the bore of the second shaft and coupled to the second shaft, the plug including a disc-shaped portion and a post extending from the disc-shaped portion and into a notch in an end of the first shaft to prevent relative rotation of the first and second rod ends, the disc-shaped portion having a second opening aligned with the first opening; and
   a pin extending through the first and second openings to prevent relative rotation of the plug and the second shaft.

2. The adjustable support link of claim 1, wherein the first and second rod ends are aligned along a longitudinal axis, and wherein at least a portion of the first and second shafts overlap in a radial direction extending from the longitudinal axis.

3. The adjustable support link of claim 1, wherein the barrel nut has a head disposed outside of the bore.

4. The adjustable support link of claim 3, wherein a portion of an external surface of the second shaft is faceted.

5. The adjustable support link of claim 1, wherein the second shaft has a third opening extending in a direction that is perpendicular to a longitudinal axis of the adjustable support link, such that at least a portion of the barrel nut that is disposed in the bore is viewable through the third opening.

6. The adjustable support link of claim 1, wherein the first external threads and the second internal threads have a first thread pitch, and the first internal threads and the second external threads have a second thread pitch different than the first thread pitch.

7. The adjustable support link of claim 1, wherein the second rod end and the barrel nut include wire openings to receive a wire to prevent rotation of the barrel nut relative to the first and second rod ends.

8. The adjustable support link of claim 1, wherein the first rod end has a first end portion with a first end portion opening to receive a first bolt, and the second rod end has a second end portion with a second end portion opening to receive a second bolt.

9. The adjustable support link of claim 8, wherein a distance between the first end portion opening and the second end portion opening is less than about 3.5 inches.

10. The adjustable support link of claim 8, wherein the first end portion opening is oriented parallel to the second end portion opening.

11. An aircraft comprising:
    an airframe;
    an engine; and
    an adjustable support link coupled between the airframe and the engine, the adjustable support link including:
    a first rod end coupled to the engine, the first rod end having a first shaft;

a second rod end coupled to the airframe, the first and second rod ends aligned along a longitudinal axis, the second rod end having a second shaft with a bore, the first shaft of the first rod end extending into the bore of the second shaft such that at least a portion of the first shaft and the second shaft overlap in a radial direction;

a barrel nut at least partially disposed in the bore of the second shaft and between the first shaft and the second shaft;

a plug disposed in the bore of the second shaft and coupled to the second shaft, a portion of the plug extending into a notch in an end of the first shaft to prevent relative rotation of the first and second rod ends, wherein the second shaft has a first opening and the plug has a second opening aligned with the first opening; and a pin disposed in the first and second openings to prevent relative rotation of the plug and the second shaft, wherein the barrel nut is rotatable in the bore of the second shaft while the pin is disposed in the first and second openings.

12. The aircraft of claim 11, wherein:

the first shaft has first external threads, the second shaft has first internal threads, the barrel nut has second external threads engaged with the first internal threads of the second rod end, and the barrel nut has a channel, the first shaft at least partially disposed in the channel, the channel having second internal threads engaged with the first external threads of the first rod end.

13. The aircraft of claim 12, wherein the barrel nut has a head disposed outside of the bore of the second shaft.

14. The aircraft of claim 11, wherein the bore extends into an end of the second shaft, wherein the first shaft extends into the bore such that the end of the first shaft is a first distance from the end of the second shaft, and wherein the first opening in the second shaft is a second distance from the end of the second shaft, the second distance being greater than the first distance.

15. The aircraft of claim 11, wherein the plug includes a disc-shaped portion and a post, the second opening formed in the disc-shaped portion, and the post extending from the disc-shaped portion and into the notch in the end of the first shaft.

16. A method comprising:

coupling an engine to an airframe of an aircraft at a forward mount;

coupling the engine to the airframe at a rear mount by coupling an adjustable support link between the engine and the airframe; and adjusting a length of the adjustable support link to move the engine relative to the airframe, the adjustable support link including:

a first rod end, the first rod end having a first shaft;

a second rod end, the first and second rod ends aligned along a longitudinal axis, the second rod end having a second shaft with a bore, the first shaft of the first rod end extending into the bore of the second shaft such that at least a portion of the first shaft and the second shaft overlap in a radial direction;

a barrel nut at least partially disposed in the bore of the second shaft and between the first shaft and the second shaft;

a plug disposed in the bore of the second shaft and coupled to the second shaft, a portion of the plug extending into a notch in an end of the first shaft to prevent relative rotation of the first and second rod ends, wherein the second shaft has a first opening and the plug has a second opening aligned with the first opening; and a pin disposed in the first and second openings to prevent relative rotation of the plug and the second shaft, wherein the barrel nut is rotatable in the bore of the second shaft while the pin is disposed in the first and second openings.

17. The method of claim 16, wherein coupling the adjustable support link between the engine and the airframe includes coupling the first rod end of the adjustable support link to a first attachment portion of the engine and coupling the second rod end of the adjustable support link to a second attachment portion of the airframe.

18. The method of claim 17, wherein the barrel nut is threadably engaged with the first shaft and threadably engaged with the second shaft, and wherein adjusting the length of the adjustable support link includes rotating the barrel nut relative to the first and second rod ends.

19. The method of claim 17, wherein the first rod end of the adjustable support link is coupled to the first attachment portion of the engine by a first bolt and the second rod end of the adjustable support link is coupled to a second attachment portion of the airframe by a second bolt.

20. The method of claim 16, wherein the plug includes a disc-shaped portion and a post, the second opening formed in the disc-shaped portion, and the post extending from the disc-shaped portion and into the notch in the end of the first shaft.

* * * * *